United States Patent [19]

Van Pool

[11] 4,241,040
[45] Dec. 23, 1980

[54] INCINERATION OF SULFUR PLANT TAIL GAS

[75] Inventor: Joe Van Pool, Bartlesville, Okla.

[73] Assignee: Phillips Petroleum Company, Bartlesville, Okla.

[21] Appl. No.: 909,079

[22] Filed: May 24, 1978

[51] Int. Cl.³ .............................................. C01B 17/50
[52] U.S. Cl. .................................... 423/542; 423/210; 423/224; 423/574 R; 422/183; 422/190; 422/194
[58] Field of Search ................... 423/210 C, 222, 224, 423/542, 573, 573 C, 574 R, 571, 576, 542, 543; 422/183, 190, 194

[56] References Cited

U.S. PATENT DOCUMENTS

| | | | |
|---|---|---|---|
| 3,830,618 | 8/1974 | Smithson et al. | 431/5 |
| 3,864,460 | 2/1975 | Connell | 423/574 |
| 3,895,101 | 7/1975 | Tsuruta | 423/574 |
| 3,941,875 | 3/1976 | Tsurata et al. | 423/571 |
| 4,060,595 | 11/1977 | Eisenlohn et al. | 423/574 R |
| 4,117,101 | 9/1978 | Fechner et al. | 423/574 R |

*Primary Examiner*—Earl C. Thomas

[57] ABSTRACT

The tail gas from a sulfur process is added directly to the fuel gas supplied to an incinerator burner. The $H_2S$ in the tail gas is converted by the burner to $SO_2$ to enable the sulfur process to meet environmental air pollution requirements.

3 Claims, 4 Drawing Figures

INCINERATION OF SULFUR PLANT TAIL GAS

This invention relates to the production of free sulfur from hydrogen sulfide ($H_2S$). In a particular aspect this invention relates to an improved method and apparatus for burning the tail gas from the sulfur process.

The recovery of free sulfur from gaseous streams containing hydrogen sulfide has become a valuable procedure in the petroleum refining industries. Such an operation results in both the recovery of valuable free sulfur and a reduction of atmospheric pollution. The free sulfur generally is produced by a process which involves the following two reactions:

$$2H_2S + 3O_2 \rightleftharpoons 2H_2O + 2SO_2 \quad (I)$$

$$2H_2S + SO_2 \rightleftharpoons 3S + 2H_2O. \quad (II)$$

The first reaction generally takes place in the combustion chamber of a boiler. Since this reaction is highly exothermic, the substantial amount of heat which is liberated is recovered in the form of steam production. One third of the source hydrogen sulfide is combined with air to form sulfur dioxide in this reaction. The remainder of the hydrogen sulfide is combined with the reaction products from the combustion chamber to carry out the second reaction in the furnace. The effluent from the furnace is cooled, and the free sulfur product is recovered as a liquid.

All the hydrogen sulfide and sulfur dioxide gases will not be converted in the furnace. The remaining unconverted gases are usually passed through two or three catalytic sulfur reactors to further convert the unreacted hydrogen sulfide and sulfur dioxide to free sulfur. The effluent from the reactors is cooled, and the free sulfur product is removed as a liquid.

The noncondensed material from the final catalytic sulfur reactor is usually simply passed to an incinerator. In the past, the noncondensed material (tail gas) from the sulfur process was charged into a heated firebox in an incinerator. The firebox is heated by passing hot combustion gases from a burner through the firebox. In general the incinerator stack must be maintained at a temperature of at least approximately 1200° F. to obtain satisfactory hydrogen sulfide to sulfur dioxide conversion to meet environmental considerations. Maintaining the incinerator stack at 1200° F. requires a large fuel gas consumption and adds considerable cost to the sulfur process.

It would obviously be desirable to be able to operate the incinerator at a lower temperature and still be able to meet environmental considerations. It is thus an object of this invention to provide a method and apparatus whereby the incineration of the tail gas from the sulfur process can be carried out at a significantly lower temperature resulting in considerable fuel savings while still meeting environmental requirements for the effluent passing from the incinerator into the atmosphere.

In accordance with the present invention a method is provided whereby the tail gas from the sulfur process is added to the fuel gas before the fuel gas is supplied to the burner of the incinerator. In this manner, combustion of the tail gas is accomplished at a substantially lower temperature than the 1200° F. stack temperature required by the previous method while still meeting strict environmental requirements for atmospheric pollution. This operation at a lower temperature results in significant fuel gas savings, thus reducing the overall cost of the sulfur process.

Additional objects and advantages of the invention will be apparent from the following description of a preferred embodiment of the invention as illustrated by the drawings in which.

Figure 1:
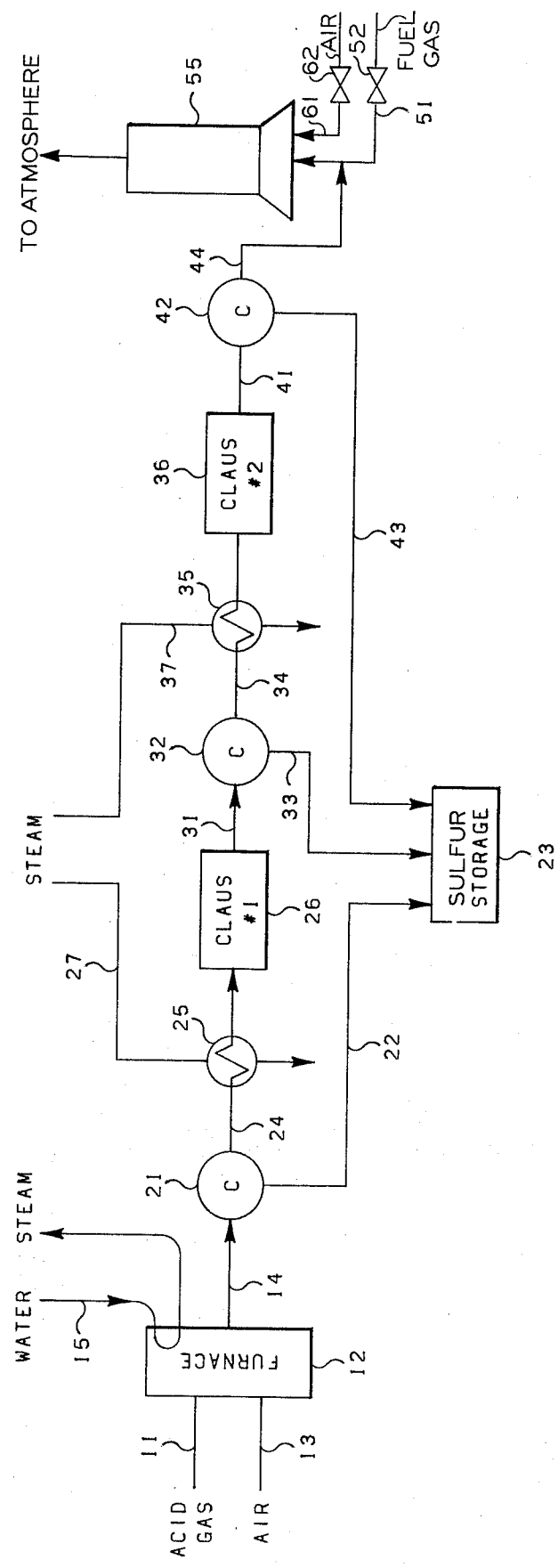
FIG. 1 is a diagrammatic illustration of a Claus sulfur plant incorporating the present invention.

For the sake of simplicity, the invention is illustrated and described in terms of a sulfur plant wherein the catalytic sulfur converters are Claus converters. Although the invention is illustrated and described in terms of a specific embodiment, the applicability of the use of the invention described herein extends to sulfur plants using different types of catalytic sulfur converters and also extends to sulfur plants which use tail gas cleanup processes before the tail gas is incinerated.

Referring now to the drawing, an acid-gas feed stream containing $H_2S$ passes through conduit means 11 into the reaction furnace 12. The reaction furnace 12 is also supplied with air via supply conduit means 13. Sufficient air is mixed with the acid-gas feed in the furnace to convert one-third of the $H_2S$ fed to the furnace to $SO_2$ and also burn any hydrocarbons present in the acid-gas feed. The well known stoichiometric reaction in the furnace is

$$2H_2S + 3O_2 \rightleftharpoons 2H_2O + 2SO_2 \quad (I)$$

$$2H_2S \rightleftharpoons SO_2 \rightleftharpoons 3S + 2H_2O. \quad (II)$$

Burning of one-third of the $H_2S$ to $SO_2$ yields a desired $H_2S/SO_2$ mol ratio of 2.0 in the reaction effluent gas which leaves the reaction furnace 12 via conduit means 14.

The flame temperature in the reaction furnace may reach temperatures of 2450° F. At such temperature some of the unburned $H_2S$ can react with the $SO_2$ formed by the reaction given in equation (I), to form free sulfur vapor in accordance with the reaction of equation (II). This will decrease the temperature of the hot gases to about 2300° F. Heat can be removed from the hot gases by heat exchange with water passed through the reaction furnace 12 via conduit means 15. The hot gases in the reaction furnace are typically cooled to 550° F. before exiting the furnace.

The hot gases pass from the reaction furnace 12 through conduit means 14 to a sulfur condenser 21. The free sulfur vapor formed in the reaction furnace 12 is condensed and the resulting liquid sulfur can then be separated from the main gas stream containing unreacted $H_2S$ and $SO_2$. The separated liquid free sulfur flows through conduit means 22 to sulfur storage tank 23.

The main gas stream from the sulfur consenser 21 must be reheated before going to a sulfur converter reactor. This is necessary to prevent sulfur condensation and subsequent catalyst fouling on the converter catalyst beds. The main gas stream flows through heat exchanger means 25 via conduit means 24 to a Claus catalytic converter 26. The main gas stream is heated to a desired temperature e.g., in the range of 400°–450° F., by the high pressure steam flowing through conduit means 27.

The reaction proceeds to a further degree of completion in the presence of the catalyst in the catalytic converter 26. The reaction involved is $$2H_2S + SO_2 \rightleftharpoons 3S + 2H_2O. \qquad (II)$$

The main gas stream which now contains free sulfur plus the unreacted $H_2S$ and $SO_2$ flows out of the Claus catalytic converter 26 through conduit means 31 to sulfur condenser 32 where the free sulfur is condensed. The condensed free sulfur flows through conduit means 33 to sulfur storage tank 23.

The thus stripped main gas stream, containing the remaining unreacted $H_2S$ and $SO_2$ and a very small amount of uncondensed free sulfur, is fed through heat exchanger means 35 via conduit means 34 to Claus catalytic converter 36. The unreacted $H_2S$ and $SO_2$ gases are again heated to a desired temperature, e.g. in the range of 400°–450° F., by high pressure steam which flows through conduit means 37.

More free sulfur is formed from the previously unreacted $H_2S$ and $SO_2$ in the Claus catalytic converter 36. The effluent stream containing free sulfur and the remaining unreacted $H_2S$ and $SO_2$ passes from the Claus catalytic converter 36 to sulfur condenser 42 via conduit means 41. Most of the free sulfur is condensed and flows through conduit means 43 to sulfur storage tank 23.

The Claus tail gas, containing the remaining unreacted $H_2S$ and $SO_2$ and a very small amount of free sulfur, flows through conduit means 44 and is mixed with fuel gas, preferably a methane rich gas, which is supplied through conduit means 51. The resulting mixture is supplied to the burner of the incinerator 55 where the fuel gas and Claus tail gas are burnt in the presence of air supplied to the burner of the incinerator 55 through conduit means 61 to convert the $H_2S$ to $SO_2$. The effluent from the incinerator 55 is vented to the atmosphere.

Control of a sulfur process such as the process illustrated in FIG. 1 is well known. The $H_2S/SO_2$ ratio to the Claus catalytic converters 26 and 36 can be maintained by manipulating the flow of air through conduit means 13 to the furnace reactor 12. The temperature of the incinerator burner is controlled simply by controlling the flow of fuel gas to the burner by means of control valve 52 located in conduit means 51. The flow of air to the burner is controlled by means of control valve 62 located in conduit means 61.

The burner temperature is considerably hotter than the hot combustion gases downstream from the burner. In the past the tail gas was incinerated by the hot combustion gases downstream from the burner. This required a higher burner heat release than the present invention which supplies the tail gas directly to the burner. It has been found that, by using the method and apparatus of the present invention, the incinerator stack temperature can be maintained approximately 300° F. to 250° F. lower than the incinerator stack temperature required when the tail gas is incinerated by the hot combustion gases from the burner, thus resulting in considerable fuel gas savings because the incinerator stack can be maintained in the range of about 900° F. to about 950° F. rather than the 1200° F. required in the previous method of incinerating the tail gas.

Figure 3:
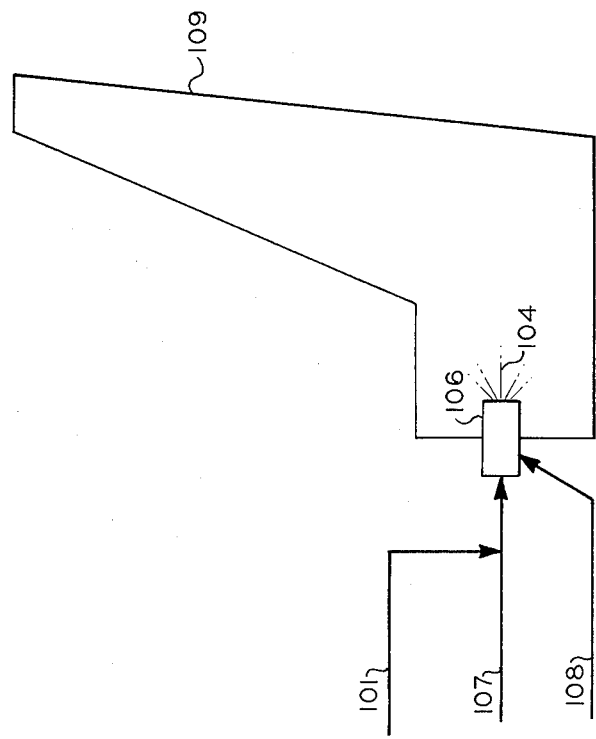
FIG. 3 is a diagrammatic illustration of the method and apparatus of the present invention for supplying the sulfur plant tail gas to the stack.
Figure 2:
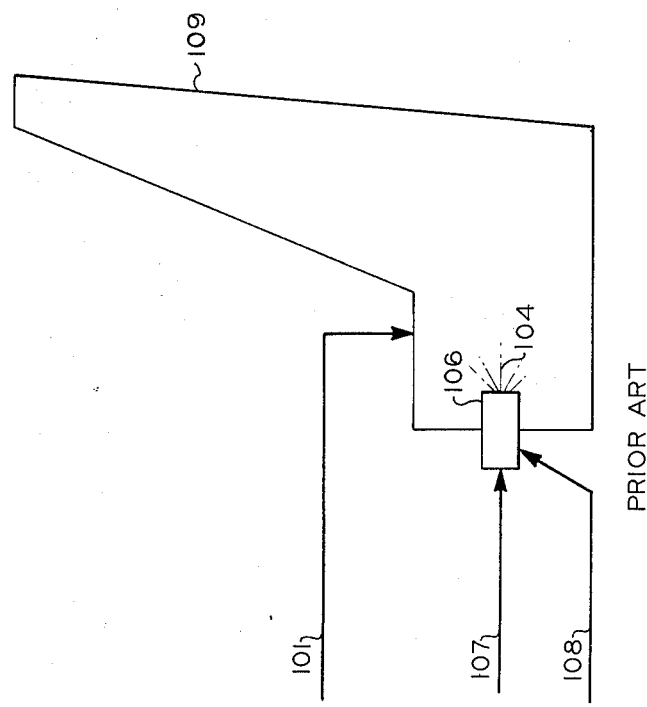
FIG. 2 is a diagrammatic illustration of the prior art method and apparatus for supplying the sulfur plant tail gas to the stack.

FIGS. 2 and 3 are presented to clearly illustrate the difference between the present invention and the prior art. FIG. 2 is illustrative of the prior art. As is illustrated in FIG. 2 the tail gas was injected through conduit means 101 into the hot combustion gases of the burner flame 104 from the burner 106 which is supplied with fuel gas through conduit means 107. The burner 106 is supplied with air through conduit means 108. As has been previously stated the prior art method (illustrated in FIG. 2) required temperatures of at least approximately 1200° F. for the stack 109.

FIG. 3 is illustrative of the method of the present invention. The conduits, burner, and stack are numbered as in FIG. 2 for the sake of comparison. In the present invention (as illustrated in FIG. 3 and FIG. 1) the tail gas is supplied through conduit means 101 to the fuel gas flowing through conduit means 107. The mixed fuel gas and tail gas is then supplied to burner means 106 where the mixture is combusted in the burner flame 104 to thereby convert the $H_2S$ to $SO_2$. This method results in a stack temperature requirement of 900° F. to 950° F. to achieve the required $H_2S$ conversion. As has been previously stated, this reduced temperature requirement results in considerable fuel savings while still meeting strict environmental requirements for atmospheric pollution.

Figure 4:
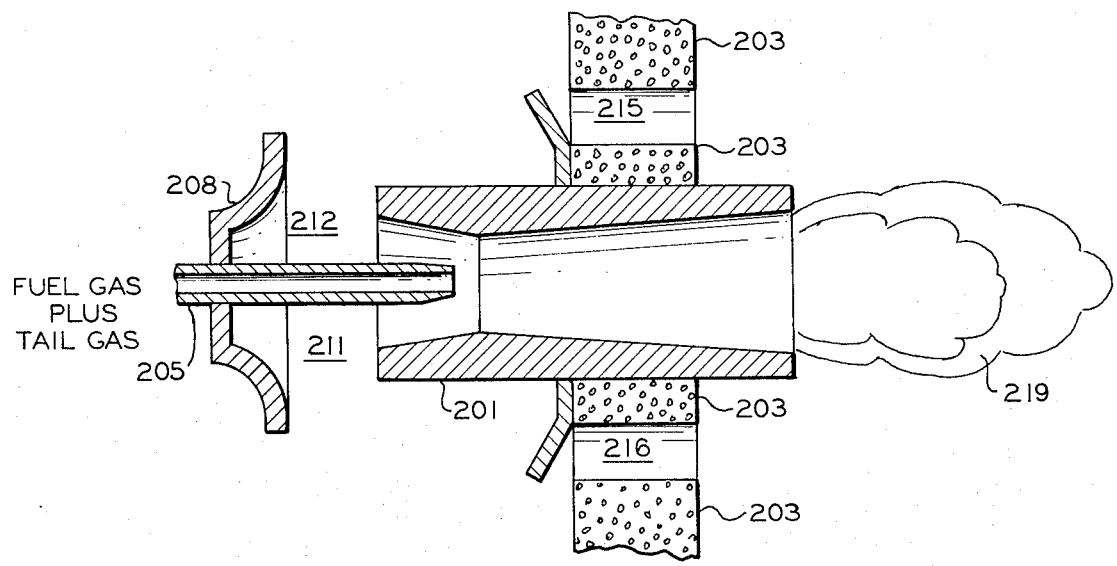
FIG. 4 is a more detailed illustration of the method and apparatus of the present invention for burning the tail gas from a sulfur process.

A typical burner construction is illustrated in FIG. 4. The burner 201 is surrounded by the wall structure 203 of the furnace or stack. A conduit means 205 supplies the mixed fuel gas and tail gas to the burner 201. The conduit means 205 is supported by structure 208. Air is supplied to the burner 201 through the openings 211 and 212. This air supply is commonly called the primary air supply. A secondary air supply is commonly provided through openings 215 and 216. The tail gas is combusted in the burner flame 219 to convert the $H_2S$ to $SO_2$.

In the present invention the quantity of fuel gas supplied to the burner is sufficient to supply enough heat to convert sufficient $H_2S$ to $SO_2$ to meet environmental pollution standards for $H_2S$. The amount of air supplied to the burner is sufficient to completely oxidize the $H_2S$ to $SO_2$.

The following examples are presented in further illustration of the invention. In the examples the stack temperature was actually measured. Also the tail gas was actually analyzed as was the stack gas. The various flow rates are calculated from the analysis of the tail gas and stack gas.

EXAMPLE A

Tail gas from a sulfur process containing 236 PPM $H_2S$ and no $SO_2$ in measurable quantities was supplied directly to the fuel gas flowing to the incinerator burner, in accordance with the present invention, at a calculated rate of 1,207,000 SCF/Hr. The amount of primary air to the burner and induced secondary air was calculated to be 442,000 SCF/Hr. Measurements of the incinerated gas were taken 80 ft. up the incinerator stack. It was found that an acceptable $H_2S$ concentration of 5 PPM, by volume, which is below the 10 PPM maximum national standard, was obtained at a stack temperature of 920° F. The measured $SO_2$ concentration of 166 PPM, by volume, was below the standard maximum 250 PPM acceptable $SO_2$ content. Fuel gas required to maintain this stack temperature was 26,416 SCF/Hr. The fuel gas had a heating value of 897

BTU/SCF. Stack gas yield was calculated as 1,664,000 SCF/Hr.

COMPARATIVE EXAMPLE A

Tail gas, from the same sulfur process as Example A, containing 236 PPM $H_2S$ and no $SO_2$ in measurable quantities was incinerated in the hot combustion gases from the burner, in accordance with previous methods, at a calculated rate of 1,207,000 SCF/Hr. Measurements of the incinerated gas were again taken 80 ft. up the incinerator stack. It was found that a stack temperature of 1200° F. was required to obtain the 5 PPM $H_2S$, by volume, concentration obtained in Example A. The $SO_2$ concentration was 148 PPM, by volume. Fuel gas required to maintain the stack temperature was 37,673 SCF/Hr. The same 897 BTU/SCF fuel gas was used. The amount of primary air to the burner and induced secondary air was calculated to be 631,000 SCF/Hr. Stack gas yield was calculated as 1,860,000 SCF/Hr.

The foregoing examples illustrate that the method of the present invention saved 11,250 SCF/Hr of fuel gas. This results in a savings of approximately $320,000/year in fuel gas cost.

While the invention has been described in terms of the presently preferred embodiment, reasonable variations and modifications are possible by those skilled in the art within the scope of the described invention and the appended claims. Such variations as using only one Claus catalytic converter, using more than two Claus catalytic converters, using different types of catalytic sulfur converters, or using a tail gas cleanup process before the tail gas is supplied to the incinerator are within the scope of the invention.

That which is claimed is:

1. A method for the treatment of a tail gas formed in a sulfur process, said tail gas containing less than about 236 parts per million (ppm) $H_2S$, said method comprising the steps of:
   mixing said tail gas with a fuel gas;
   supplying the mixture of said fuel gas and said tail gas to a burner means to therein convert substantially all of the $H_2S$ in said tail gas to $SO_2$; and
   venting the combustion product resulting from the combustion of the mixture of said fuel gas and said tail gas through a stack to the atmosphere, the conversion of substantially all of said $H_2S$ in said tail gas to said $SO_2$ being accomplished at a stack temperature in the range of about 900° F. to about 950° F., said combustion product containing less than about 10 PPM $H_2S$.

2. A method in accordance with claim 1 wherein the conversion of substantially all of said $H_2S$ in said tail gas to said $SO_2$ is accomplished at a stack temperature of about 920° F.

3. A method in accordance with claim 1 wherein said fuel gas is a methane rich gas.

* * * * *